United States Patent
Watts, III et al.

(10) Patent No.: US 7,668,707 B2
(45) Date of Patent: Feb. 23, 2010

(54) SYSTEMS AND METHODS FOR THE DETERMINATION OF ACTIVE CONSTRAINTS IN A NETWORK USING SLACK VARIABLES AND PLURALITY OF SLACK VARIABLE MULTIPLIERS

(75) Inventors: James William Watts, III, Houston, TX (US); Graham Fleming, Houston, TX (US); Qin Lu, Katy, TX (US)

(73) Assignee: Landmark Graphics Corporation, Houston, TX (US)

( * ) Notice: Subject to any disclaimer, the term of this patent is extended or adjusted under 35 U.S.C. 154(b) by 0 days.

(21) Appl. No.: 12/258,876

(22) Filed: Oct. 27, 2008

(65) Prior Publication Data
US 2009/0138213 A1 May 28, 2009

Related U.S. Application Data

(60) Provisional application No. 60/990,823, filed on Nov. 28, 2007.

(51) Int. Cl.
G06G 7/50 (2006.01)
(52) U.S. Cl. .................................................. 703/10
(58) Field of Classification Search .............. 703/10
See application file for complete search history.

(56) References Cited

U.S. PATENT DOCUMENTS

| | | | |
|---|---|---|---|
| 4,885,686 A | 12/1989 | Vanderbei | |
| 4,914,563 A | 4/1990 | Karmarkar et al. | |
| 5,424,963 A * | 6/1995 | Turner et al. | 703/6 |
| 5,446,652 A | 8/1995 | Peterson et al. | |
| 5,638,267 A | 6/1997 | Singhose et al. | |
| 5,930,762 A | 7/1999 | Masch | |
| 6,101,447 A | 8/2000 | Poe, Jr. | |
| 6,618,694 B1 | 9/2003 | Shibuya et al. | |
| 6,775,597 B1 | 8/2004 | Ristanovic et al. | |
| 6,961,685 B2 | 11/2005 | Sy | |
| 7,050,953 B2 | 5/2006 | Chiang et al. | |
| 7,315,846 B2 | 1/2008 | Hartman et al. | |
| 7,337,022 B2 * | 2/2008 | Wojsznis et al. | 700/36 |
| 7,379,853 B2 | 5/2008 | Middya | |
| 7,444,312 B2 * | 10/2008 | Hillermeier et al. | 706/45 |
| 2004/0049295 A1 * | 3/2004 | Wojsznis et al. | 700/28 |

(Continued)

FOREIGN PATENT DOCUMENTS

WO 9930249 A1 6/1999

(Continued)

OTHER PUBLICATIONS

Determination of Active Constraints in a Network; Author J.W. Watts, SPE, G.C. Fleming, SPE, and Q. Lu, SPE, Halliburton SPE 118877-MS 2009, pp. 1-12.*

(Continued)

*Primary Examiner*—Kamini S Shah
*Assistant Examiner*—Akash Saxena
(74) *Attorney, Agent, or Firm*—Crain Caton & James (57) ABSTRACT

Systems and methods for determining active constraints in a surface facility network, which include the use of slack variables and multipliers in system equations to eliminate the extraneous (inactive) constraints.

16 Claims, 5 Drawing Sheets

U.S. PATENT DOCUMENTS

| | | | |
|---|---|---|---|
| 2005/0240427 A1 | 10/2005 | Crichlow | |
| 2005/0256683 A1* | 11/2005 | Hillermeier | 703/1 |
| 2006/0085174 A1* | 4/2006 | Hemanthkumar et al. | 703/10 |
| 2006/0089864 A1* | 4/2006 | Feng et al. | 705/7 |
| 2007/0255779 A1 | 11/2007 | Watts, III | |
| 2007/0260333 A1 | 11/2007 | Peureux et al. | |
| 2009/0070085 A1* | 3/2009 | Gullapalli et al. | 703/10 |
| 2009/0105966 A1* | 4/2009 | Brown et al. | 702/30 |

FOREIGN PATENT DOCUMENTS

| | | |
|---|---|---|
| WO | 2007028158 A3 | 3/2007 |

OTHER PUBLICATIONS

Facchinei, F., Fischer, A., and Kanzow, C. 1998. On the Accurate Identification of Active Constraints. SIAM J. on Optimization 9, (May 1, 1998), 14-32. DOI= http://dx.doi.org/10.1137/S1052623496305882.*

Integrated Optimization for Rate Allocation in Reservoir Simulation; Jeffrey E. Davidson, Bret L. Beckner, ExxonMobil Upstream Research Co.; SPE 87309-PA 2003; pp. 426-432.*

Jacobson, D.; Lele, M., "A transformation technique for optimal control problems with a state variable inequality constraint," Automatic Control, IEEE Transactions on , vol. 14, No. 5, pp. 457-464, Oct. 1969.*

Production Optimization With Adjoint Models Under Nonlinear Control-State Path Inequality Constraints ; P. Sarma, Stanford U.; W.H. Chen, Chevron ETC; and L.J. Durlofsky and K. Aziz, Stanford U. SPE 99959-MS 2006 ; pp. 2-19.*

Abbas Seif, Keith W. Hipel; "An improved Interior-point approach for use in reservoir operation" http://citeseerx.ist.psu.edu/viewdoc/summary?doi=10.1.1.56.6904; 1996; 8 pgs.

Wei Xiao, Zhibin Liu, and Maoze Jiang; "Multiobjective linear programming model on injection oilfield recovery system" Computers & Mathematics with Applications, vol. 36, issue 5, Sep. 1998, pp. 127-135 http://dx.doi.org/10.1016/S0898-1221(98)00155-2.

K. Ponnambalam, A. Vanneilli and T. E. Unny "An application of Karmarkar's Interior-point linear programming algorithm for multi-reservoir operations optimization" Stochastic Environmental Research and Risk Assessment, Springer Berlin / Heidelberg, vol. 3, No. 1 / Mar. 1989, pp. 17-29; ISSN 1436-3240 (Print) 1436-3259 (Online); DOI 10.1007/BF01543425 http://www.springerlink.com/content/m174747741m53040/.

B. Coulbeck "Optimal operations in non-linear water networks" Optimal Control Applications and Methods, vol. 1 Issue 2, 1979, pp. 131-141 http://www3.interscience.wiley.com/journal/114028312/abstract.

Anibal Tavares De Azevedo "An Interior-Point Method for Long Term Scheduling of Large Scale Hydrothermal System" http://citeseerx.ist.psu.edu/viewdoc/summary?doi=10.1.1.83.739; 2004; 6 pgs.

John M. Bohannon; "A Linear Programming Model for Optimum Development of Multi-Reservoir Pipeline Systems" Journal Journal of Petroleum Technology, vol. 22, No. 11, 1970, pp. 1429-1436; DOI: 10.2118/2626-PA; Paper No. 2626-PA http://vvww.spe.org/elibrary/servlet/spepreview?id=00002626&speCommonAppContext=ELIBRARY#.

R. Fletcher; "Practical Methods of Optimization" 2nd Ed.; John Wiley and Sons, Ltd. 2004; pp. 139-258.

B. K. Coats, G. C. Fleming, J. W. Watts, M. Rame, and G. S. Shiralkar; "A Generalized Wellbore and Surface Facility Model, Fully Coupled to a Resérvoir Simulator"; Society of Petroleum Engineers Reservoir Simulation Symposium; Houston TX; Feb. 3-5, 2003; SPE 79704; pp. 132-142.

G.S. Shiralkar, J. W. Watts; "An Efficient Formulation for Simultaneous Solution of the Surface Network Equations" pp. 1-6; 2005 Society of Petroleum Engineers Symposium on Reservoir Simulation; Houston TX Jan. 13-Feb. 2, 2005; SPE 93703.

Xiao, W., Liu, Z., Jiang, A. Multiobjective Linear Programming Model on Injection Oilfield Recovery System. Computers & Mathematics with Applications, vol. 36, Issue 5, Sep. 1998. 2 pages, Abstract Only.

Ponnambalam K., Vanneilli A., Unny T. E. An Application of Karmarkar's Interior-Point Linear Programming Algorithm for Multi-Reservoir Operations Optimizatio. Stochastic Environmental Research and Risk Assessment, vol. 3, No. 1, 1989. 3 pages, Abstract Only.

Coulbeck, B. Optimal Operations in Non-Linear Water Networks. Optimal Control Applications and Methods. vol. 1, Issue 2, 1979. 1 page, Abstract Only.

Tavares De Azevedo, A. An Interior-Point Method for Long Term Scheduling of Large Scale Hydrothermal System. 6 pages, 2003.

Bohannon, John N. A Linear Programming Model for Optimum Development of Multi-Reservoir Pipeline Systems. Journal of Petroleum Technology, vol. 22, No. 11, 1970, 1 page.

* cited by examiner

SYSTEMS AND METHODS FOR THE DETERMINATION OF ACTIVE CONSTRAINTS IN A NETWORK USING SLACK VARIABLES AND PLURALITY OF SLACK VARIABLE MULTIPLIERS

CROSS-REFERENCE TO RELATED APPLICATIONS

The priority of U.S. Provisional Patent Application No. 60/990,823, filed on Nov. 28, 2007, is hereby claimed, and the specification thereof is incorporated herein by reference.

STATEMENT REGARDING FEDERALLY SPONSORED RESEARCH

Not applicable.

FIELD OF THE INVENTION

The present invention generally relates to systems and methods for determining active constraints in a surface facility network. More particularly, the present invention utilizes slack variables and multiplier values in the system equations to eliminate extraneous (inactive) constraints.

BACKGROUND OF THE INVENTION

Figure 1:
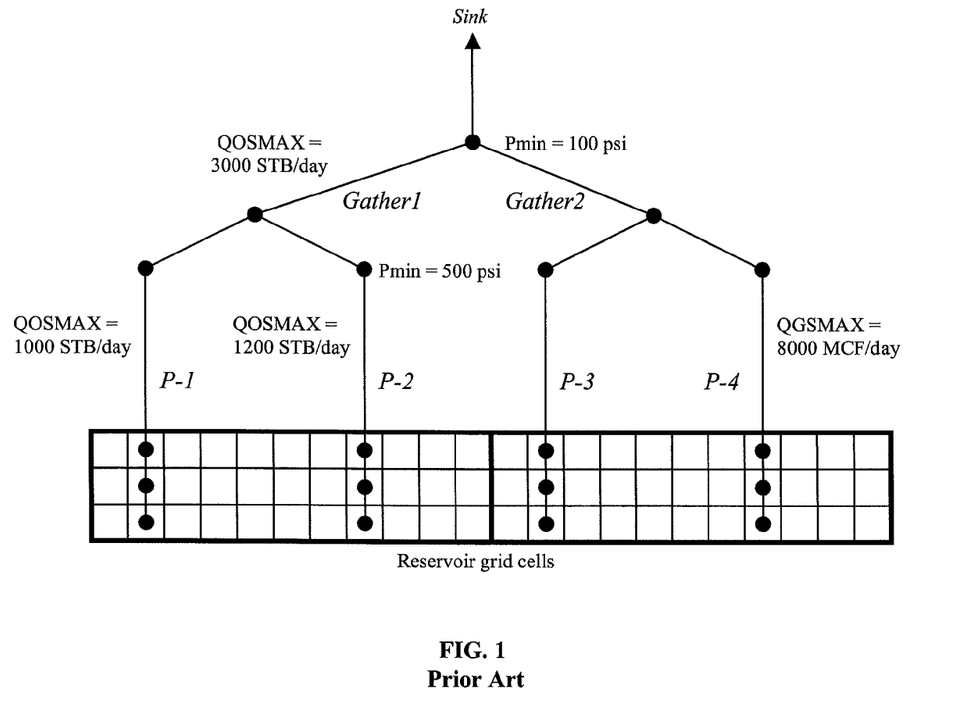
FIG. 1 illustrates an exemplary surface facility network with constraints.

In the field of oil and gas production, a surface facility network system may be represented as sets of nodes, connections between nodes, connections between nodes and reservoir grid cells (perforations), and connections between nodes and sinks (production) or sources (injection). An exemplary surface facility network with constraints is illustrated in FIG. 1.

A major difficulty in flow network calculations is determining which of the possible constraints are active. For example, there may be hundreds, or perhaps thousands, of constraints that interact in various ways. This most likely would make a simple trial and error approach prohibitively expensive, because each trial would require factoring the facility matrix. Moreover, certain constraints can be mutually incompatible. There cannot be two active rate constraints, for example, within a single flow line because this results in a singular matrix.

Different kinds of rate constraints can be applied to the connections such as, for example, QOSMAX, which is the maximum oil phase rate constraint at a surface condition. Likewise, different kinds of minimum/maximum pressure constraints ($P_{min}/P_{max}$) can be applied to the nodes. The rate constraint is typically enforced by a valve at the connection. The $P_{min}$ constraint at a node is enforced by a valve at the downstream connection of the node, and the $P_{max}$ constraint is enforced by a valve at the upstream connection of the node. If there is no constraint specified (or the constraint is inactive), a hydraulics equation may be applied at the connection to relate the fluid component rates and the end node pressures.

A set of equations must be set up to solve for the fluid component rates in connections and pressures at nodes. The equations are typically based on properties of the network and given constraints and may include:

(a) Fluid component mass balance equations at nodes.
(b) Connection equations at connections, which can be (i) a hydraulics equation, (ii) a rate constraint equation, (iii) a pressure constraint equation at the downstream connection of a node with $P_{min}$ constraint, or at the upstream connection of a node with $P_{max}$ constraint, or (iv) other kinds of constraints, such as separation/splitting constraint equations.
(c) Perforation equations at perforations.

Equations (a) and (c) are fixed, while an algorithm is needed to choose only one of the possible connection equations for each connection at which there is more than one possible connection equation. The algorithm must decide which one of the possible connection equations should be chosen for a given connection, bearing in mind that an over-constrained network system cannot be solved and each connection can have only one connection equation. If the network system is over constrained, then a singular matrix of the system equations is created that can not be solved by the linear solver at a Newton step when the Newton method is used to solve the system of nonlinear equations of the network. The Newton method is one of the standard methods that can solve a system of nonlinear equations; it uses the solution of a set of linear equations, which is obtained based on the Taylor series expansion of the nonlinear equations to approximate the solution of the nonlinear equation. This linearization process may be repeated in multiple iterations until the solution converges. Each iteration is called a Newton step.

Figure 2:
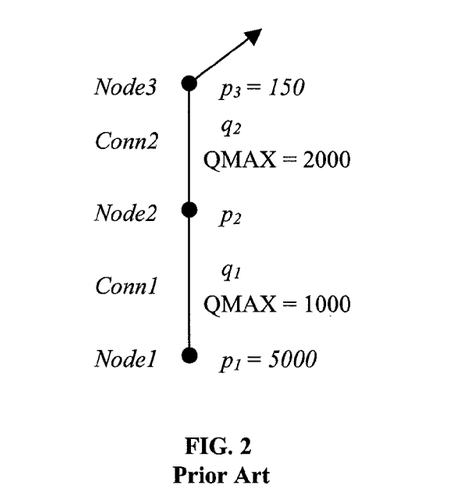
FIG. 2 illustrates an exemplary section of an over-constrained surface-facility network.

An exemplary section of an over-constrained surface-facility network is illustrated in FIG. 2. In this example, it is assumed that the fluid has only one component. The unknowns of the system are thus, $q_1$, $q_2$, and $p_2$, which are the rate at Conn1, the rate at Conn2 and the pressure at Node2, respectively; while $p_1$ (pressure at Node1) and $p_3$ (pressure at Node3) are constants ($p_1=5000$, $p_3=150$). It is also assumed for this example, that the pressure drop between Node1 and Node3 is large enough that the two rate constraints will be violated when the valves at Conn1 and Conn2 are fully opened. The two rate constraint equations, which are chosen to be the connection equations at Conn1 and Conn2, and the mass balance equation at Node2 are, respectively:

$$q_1 = 1000, \quad (1)$$

$$q_2 = 2000, \quad (2)$$

$$q_1 - q_2 = 0, \quad (3)$$

It is clear that the three equations are contradictory and cannot all be satisfied, and that the pressure at Node2 is undetermined since this pressure does not appear in any of the equations. If the unknowns are ordered as $q_1$, $q_2$, $p_2$, then the system equation matrix becomes:

$$\begin{bmatrix} 1 & 0 & 0 \\ 0 & 1 & 0 \\ 1 & -1 & 0 \end{bmatrix}, \quad (4)$$

which is singular and can not be solved.

The QMAX constraint at Conn2 may be removed, since its value is greater than the QMAX constraint at Conn1. In other words, the rate must be equal to or less than the smaller of the two QMAX constraints, which is QMAX=1000 at Conn1. The QMAX constraint at Conn2 (equation (2)) may be replaced by the hydraulics equation:

$$-p_2 + p_3 + b_2 q_2 + c_2 = 0, \quad (5)$$

where $b_2$ and $c_2$ are constants determined by the hydraulics correlation. The network system can now be solved because the matrix of the equation system:

$$\begin{bmatrix} 1 & 0 & 0 \\ 0 & 1 & 0 \\ 1 & b_2 & -1 \end{bmatrix}, \quad (6)$$

is not singular.

Figure 3:
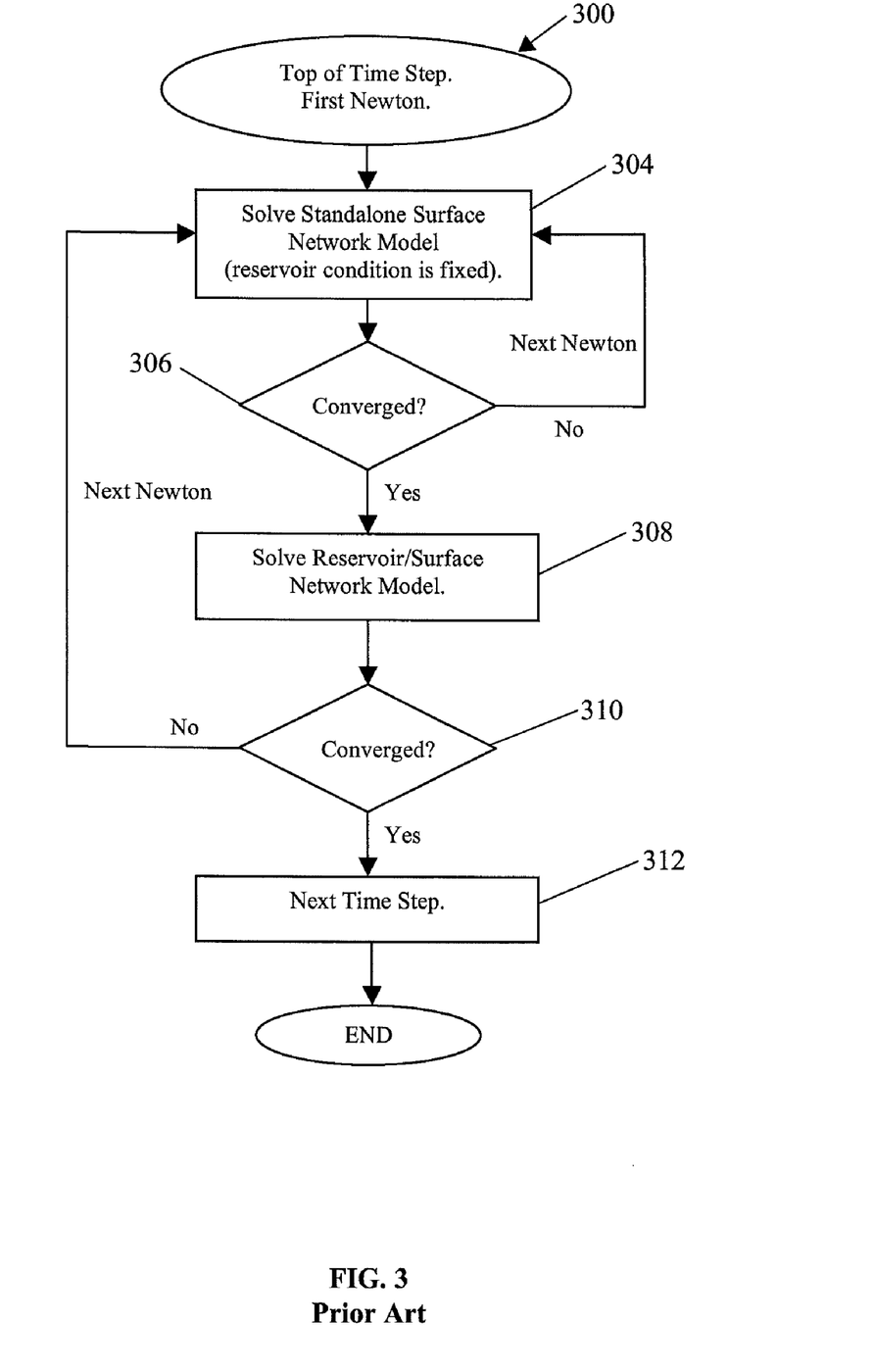
FIG. 3 is a flow diagram illustrating a Nexus® work flow.
Figure 4:
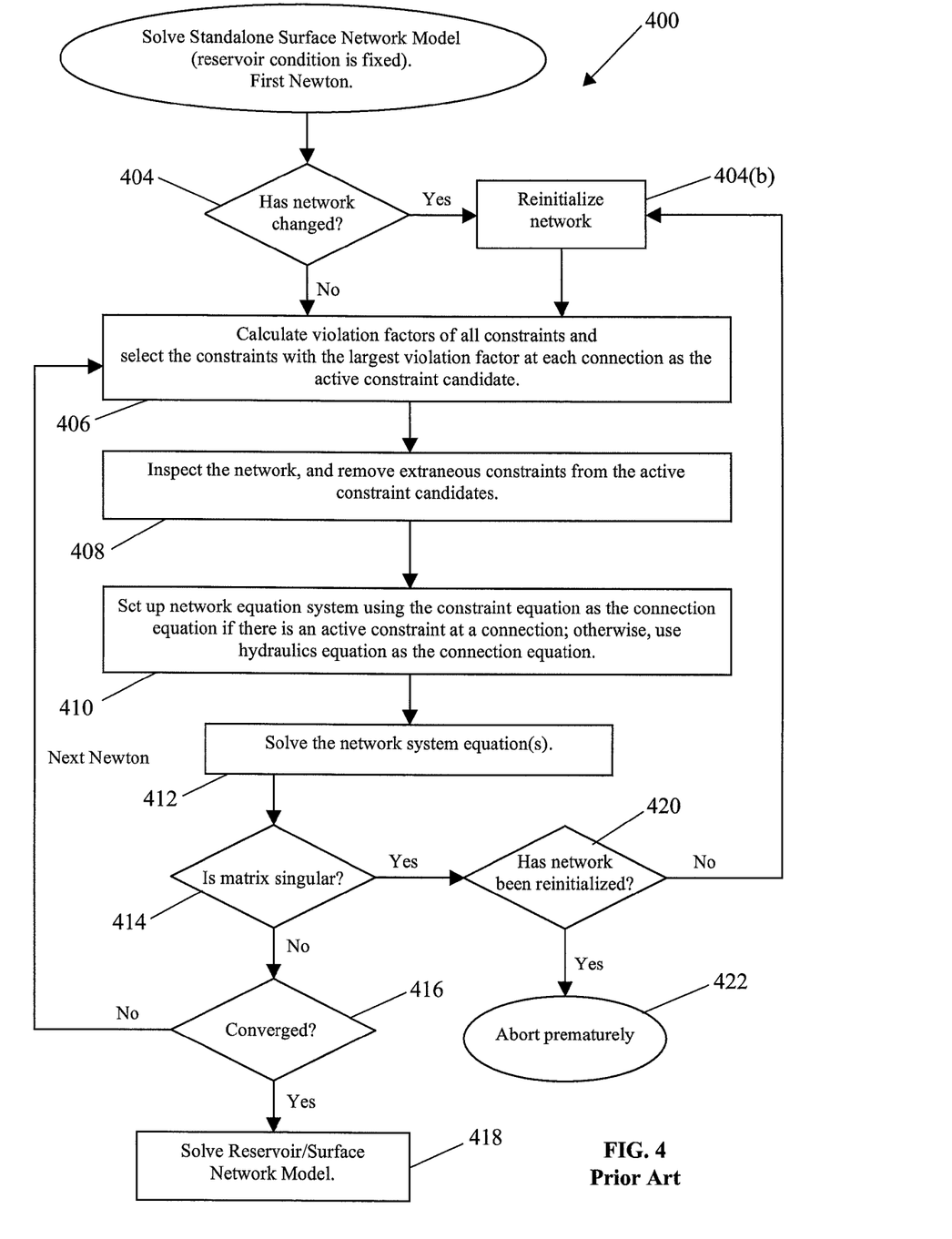
FIG. 4 is a flow diagram illustrating a conventional method for determining the active constraints in a surface-facility network.

Nexus®, which is a commercial-reservoir-simulator application marketed by Landmark Graphics Corporation, typically models the reservoir and surface facility network system (including wells) in a fully coupled manner by heuristically eliminating extraneous constraints in the manner illustrated by FIG. 3 and FIG. 4 and therefore, can be just as expensive as other traditional methods of determining active constraints. FIG. 3 illustrates the overall workflow 300 of a Nexus® time-step simulation. The work flow 300 begins at the First Newton—also referred to as the top of the time step. In step 304, the standalone surface network model is solved with a fixed reservoir condition in the manner described more particularly in reference to FIG. 4. In step 306, the work flow 300 determines whether there is convergence of the standalone-surface-network model Newton steps. If there is no convergence, then the work flow 300 repeats the next Newton step at step 304. If there is convergence, then the work flow 300 solves the coupled reservoir/surface network model at step 308 and determines whether there is convergence of the standalone-surface-network model Newton steps at step 310. At step 312, the work flow 300 proceeds to the next time step.

A conventional method for solving the standalone-surface-network model at step 304 in FIG. 3 is illustrated by the method 400 in FIG. 4. The method 400 begins at the first Newton of the standalone-network solve and heuristically determines the active constraints by eliminating extraneous constraints. In step 404, the user specified network configuration and constraints are checked for any change at the current time step. If there is no change, then the method 400 proceeds to step 406; otherwise, the network is reinitialized at step 404(b) and then the method 400 proceeds to step 406.

In step 406, the values of fluid rates and node pressures at each current Newton step are compared with the constraint values to determine the violation factor of each constraint. In other words, each connection and node are analyzed to determine if there are any constraints violated and how much they are violated. The constraint with the largest violation factor at each connection and node is selected as an active constraint candidate.

In step 408, all extraneous constraints in the network are removed as active constraint candidates. All remaining constraints are active constraints. In FIG. 1, for example, the sum of the QOSMAX constraints in connections P-1 and P-2 is smaller than the QOSMAX constraint in Gather1. If the constraints in P-1 and P-2 are satisfied, which they must be, the constraint in Gather1 is automatically satisfied also. As a result, the constraint in Gather1 is extraneous and should be removed.

However, in a situation where connection Gather1 is separated from connection P-1 and connection P-2 by a complex network consisting of hundreds, or perhaps thousands, of connections, which may have different sorts of constraints themselves, this manner of checking logic can be prohibitively expensive and unreliable. It may, for example, miss some extraneous constraints, which results in a singular matrix, or it may remove some constraints that should be kept, which results in inaccurate solutions.

In step 410, the constraint equation is applied as the connection equation at each connection that has an active constraint. Otherwise, the hydraulics equation is applied as the connection equation. In step 412, the linearized network system equation(s) are solved using a well known linear solver.

In step 414, the linear solver determines whether the network system equation(s) results in a singular matrix. If the matrix is singular, the method proceeds to step 420 and determines whether the network has been reinitialized. If the network has been reinitialized, then the method 400 aborts prematurely at step 422. If the network has not been reinitialized, then the method 400 repeats at step 404(b) and reinitializes the network. If the matrix, however, is not singular, then the method 400 determines whether convergence has occurred at step 416. If convergence has not occurred, then the method 400 repeats at step 406, which is the next Newton step. If convergence is achieved, then the method 400 proceeds to solve the coupled reservoir/surface network model at step 418.

When the method 400 is used, it uses the active constraint set determined by step 304 (with a fixed reservoir condition) to construct a network equation. However, it may result in a different set of active constraints from that of step 304 if the reservoir condition has changed, which means the network equations were incorrect. This will force one or more Newton steps.

Other well known and accepted methods for determining active constraints in a surface facility network may be equally expensive, unreliable and/or inefficient such as, for example, the optimization methods described in Practical Methods of Optimization, Second Edition, by R. Fletcher, Linear Programming, which requires the maximum value of certain objective functions to be calculated when constraints are applied.

Therefore, there is a need for a systematic approach to determine the active constraints in a surface-facility network that is more efficient and reliable than conventional means.

SUMMARY OF THE INVENTION

The present invention overcomes one or more deficiencies in the prior art by providing systems and methods for determining active constraints in a network.

SUMMARY OF THE INVENTION

In one embodiment, the present invention includes a method for determining active constraint equations in a network, which comprises i) selecting at least one constraint equation for a connection in the network, each constraint equation including a respective slack variable and a respective slack variable multiplier; ii) selecting a base equation for each connection in the network, the base equation for the network connection with the at least one constraint equation including the respective slack variable of each constraint equation and another respective slack variable multiplier for the respective slack variable of each constraint equation; iii) solving for each respective slack variable using a computer system; iv) adjusting a respective parameter for each respective slack variable multiplier and each respective another slack variable multiplier based on a solution for each respective slack variable; v) repeating the steps of solving for each respective slack variable and adjusting a respective parameter for each respective slack variable multiplier and each respective another slack variable multiplier until each respective parameter is equal to 0 or 1; and vi) determining whether each constraint equation in the network is active based on whether the respective parameter for each constraint equation is equal to 1.

In another embodiment, the present invention includes a computer readable medium having computer executable instructions for determining active constraint equations in a network. The instructions are executable to implement i) selecting at least one constraint equation for a connection in the network, each constraint equation including a respective slack variable and a respective slack variable multiplier; ii) selecting a base equation for each connection in the network, the base equation for the network connection with the at least one constraint equation including the respective slack variable of each constraint equation and another respective slack variable multiplier for the respective slack variable of each constraint equation; iii) solving for each respective slack variable; iv) adjusting a respective parameter for each respective slack variable multiplier and each respective another slack variable multiplier based on a solution for each respective slack variable; v) repeating the steps of solving for each respective slack variable and adjusting a respective parameter for each respective slack variable multiplier and each respective another slack variable multiplier until each respective parameter is equal to 0 or 1 predetermined values; and vi) determining whether each constraint equation in the network is active based on whether the respective parameter for each constraint equation is equal to 1.

Additional aspects, advantages and embodiments of the invention will become apparent to those skilled in the art from the following description of the various embodiments and related drawings.

BRIEF DESCRIPTION OF THE DRAWINGS

The present invention is described below with references to the accompanying drawings in which like elements are referenced with like reference numerals, and in which.

DETAILED DESCRIPTION OF THE PREFERRED EMBODIMENTS

The subject matter of the present invention is described with specificity, however, the description itself is not intended to limit the scope of the invention. The subject matter thus, might also be embodied in other ways, to include different steps or combinations of steps similar to the ones described herein, in conjunction with other present or future technologies. Moreover, although the term "step" may be used herein to describe different elements of methods employed, the term should not be interpreted as implying any particular order among or between various steps herein disclosed unless otherwise expressly limited by the description to a particular order.

A slack variable provides a way to ensure that a constraint equation is always satisfied. The slack variable is added to the constraint equation. Then, if the constraint is inactive, the slack variable takes up the slack—that is, it becomes the amount by which the inactive constraint equation as originally written is not satisfied.

Slack variables are normally used in a group of inequality constraint equations, some of which are active. In the present invention, however, the equations typically come in pairs. There is the base equation, which applies if the constraint is inactive, and there is the constraint equation, which applies if the constraint is active. One and only one of these two equations will be active. A slack variable is thus, added to the inactive equation and not to the active one. To do this, two multipliers are defined. A first multiplier times the slack variable is added to the base equation, and a second multiplier times the slack variable is added to the constraint equation. A procedure described below is used to determine the two multipliers. Eventually, the procedure leads to one of the multipliers being zero and the other being one. The equation in which the multiplier is zero does not contain the slack variable and thus is active, and the equation in which the multiplier is one contains the slack variable and thus is inactive. The multipliers are computed as functions of a parameter (w). The first multiplier is set equal to (w) and the second is set equal to (1−w). Other functional forms such as, for example, $$\sin^2 \frac{w\pi}{2}$$

and $$\cos^2 \frac{w\pi}{2}$$

may be used to compute the multipliers, however, (w) and (1−w) are used herein to illustrate the various examples. Then if w=1, the slack variable is added to the base equation, and the constraint is active. If w=0, then the slack variable is added to the constraint equation, and the constraint is inactive. The following methodology describes the process in more detail.

Rate Constraint

For two components, a linearized hydraulics equation is:

$$-p_i + p_o + a_1 q_1 + a_2 q_2 = d \quad (7)$$

and a linearized rate constraint is:

$$b_1 q_1 + b_2 q_2 = q_{max} \quad (8)$$

At a given connection, one or the other of these equations must apply. To the hydraulics equation, we add a slack variable times a multiplier. Equation (7) becomes:

$$-p_i + p_o + a_1 q_1 + a_2 q_2 + w_c s_c = d \quad (9)$$

where $w_c$ is the multiplier, $s_c$ is the slack variable and c denotes a particular constraint. To the constraint equation, we add the same slack variable times another multiplier $(1-w_c)$. Equation (8) becomes:

$$-b_1 q_1 - b_2 q_2 + (1-w_c) s_c = -q_{max} \quad (10)$$

The signs in the equation are changed in order to be able to add, rather than subtract, the slack variable contribution while also constructing the equation in such a way that a negative slack variable is valid and a positive one is not.

It is required that $0 \leq w_c \leq 1$, and that at the solution, $w_c$ will be equal to either zero or one. The slack variable appears in the inactive equation and not in the active equation. Thus, $w_c=1$ indicates that the rate constraint is active, and $w_c=0$ indicates that the hydraulics equation is active.

Considering the hydraulics equation, the computed pressure drop can be larger than that computed with no slack variable, but it cannot be smaller. As a result, a positive value of $s_c$ can be valid in this equation, but a negative value cannot. Thus, if $s_c \leq 0$, it is preferred that $w_c=0$, making the hydraulics equation active and the rate constraint inactive. Now considering the rate constraint, the computed rate can be smaller but not larger than the specification. A negative value of $s_c$ can be valid in this equation, but not a positive one. If $s_c>0$, it is preferred that $w_c=1$, making the rate constraint active and the hydraulics equation inactive.

Given the foregoing, each constraint's $w_c$ may be determined as follows. To begin, set all $w_c=0.5$ and solve the network. Then, adjust the $w_c$. If $s_c \leqq 0$ reduce $w_c$ by a reduction factor (R):

$$w_c^{k+1}=Rw_c^k \tag{11}$$

If $s_c>0$, then increase $w_c$ so that the quantity $(1-w_c)$ is reduced by the same reduction factor $(1-R)$:

$$w_c^{k+1}=1-R(1-w_c^k) \tag{12}$$

Other reduction factors such as, for example, ones that vary in magnitude as $w_c$ approaches zero or one may be used, however, the constant R is used herein to illustrate the various examples. Also, a different reduction factor can be used when s is greater than the one used when it is less than or equal to zero, but the same R is used herein.

This process is continued until $w_c^{k+1}$ is less than a tolerance if $s_c \leqq 0$, or $1-w_c^{k+1}$ is less than the tolerance if $s_c>0$. The calculations typically use R=0.01 and the tolerance=1.0 e-8. One other step is taken. It can happen that a slack variable goes negative after its w has been set to one or that it goes positive after its parameter w has been set to zero. When this happens, reset the parameter w to 0.5 and continue the iteration.

Preferably, an equation that contains $s_c$, but not $w_c$, is desired. To get this, Equation (10) is added to Equation (9) to obtain a combined rate constraint-hydraulics equation:

$$-p_i+p_o+(a_1-b_1)q_1+(a_2-b_2)q_2+s_c=d-q_{max} \tag{13}$$

An equation that does not contain $w_c$ can be obtained by simply adding Equations (9) and (10) because the slack variable multipliers in the two equations are $w_c$ and $(1-w_c)$ respectively, and the sum of these two multipliers is one. One skilled in the art will appreciate that the two equations can be combined in other ways to obtain the same result if the two multipliers do not sum to one.

Pressure Constraint

The pressure constraint equation is:

$$p_i=p_{min} \tag{14}$$

Using a process similar to that described above for the rate constraint, suggests that this constraint should be subtracted from the hydraulics equation, Equation (7). However, $p_i$ will be eliminated, which might cause problems in the later solution. As a result, this equation is divided by two before introducing the slack variable. The result is:

$$\frac{1}{2}p_i + (1-w_c)s_c = \frac{1}{2}p_{min} \tag{15}$$

Adding Equation (9) to Equation (3) yields an equation containing $s_c$ but not $w_c$:

$$-\frac{1}{2}p_i + p_o + a_1q_1 + a_2q_2 + s_c = d + \frac{1}{2}p_{min} \tag{16}$$

Separator Outflow

A separator has at least two outflowing streams. One of these will have pressure continuity, which leads to the following equation:

$$p_i-p_{o,j}=0 \tag{17}$$

Here, the i denotes the separator inlet node and the o,j denotes the $j^{th}$ separator outlet node. The first (j=1) outlet equation is treated as the base equation and the other outlet equations are treated as constraints. If there are three outlets, the three equations are as follows:

$$-p_i-p_{o,1}+w_2s_2+w_3s_3=0 \tag{18}$$

$$p_i-p_{o,2}+(1-w_2)s_2=0 \tag{19}$$

$$p_i-p_{o,3}+(1-w_3)s_3=0 \tag{20}$$

Here, the 2 and 3 subscripts on the s's and w's denote the slack variables associated with outflows 2 and 3, respectively. Adding Equations (18) through (20) yields:

$$p_i+p_{o,1}-p_{o,2}-p_{o,3}+s_2+s_3=0 \tag{21}$$

Now the point of the manipulations that lead to equations having s's but not w's will be addressed. Factoring the network matrix costs much more than solving it once the factors are available. If it must be refactored each time the w's change, which will be at each w iteration, the cost might be prohibitive. Most of this cost may be avoided by generating equations (Equations (13), (16), and (21)) that contain s but not w. The unknowns are ordered such that the s's are last and the equations are ordered such that the constraint equations (Equations (10), (15) (19), and (20)) are last. The result is a partitioned matrix of the following form:

$$\begin{bmatrix} A_{xx} & A_{xs} \\ A_{sx} & A_{ss}(w) \end{bmatrix} \begin{bmatrix} x \\ s \end{bmatrix} = \begin{bmatrix} r_x \\ r_s \end{bmatrix} \tag{22}$$

The unknown vector x contains the connection rates and node pressures; these are all of the unknowns other than the slack variables. The unknown vector s contains all of the slack variables. The matrices $A_{xx}$ and $A_{xs}$ define node mass balance equations, hydraulics equations, and combined constraint-hydraulics equations such as Equation (13). The matrices $A_{sx}$ and $A_{ss}(w)$ define constraint equations. The matrices $A_{xx}$, $A_{xs}$, and $A_{sx}$ do not contain any multipliers and thus do not depend on w. Only $A_{ss}(w)$ depends on w. This makes it possible to factor $A_{xx}$ and then the entire matrix as follows:

$$\begin{bmatrix} L & 0 \\ A_{sx}U^{-1} & A_{ss}(w) - A_{sx}U^{-1}L^{-1}A_{xs} \end{bmatrix} \begin{bmatrix} U & L^{-1}A_{xs} \\ 0 & I \end{bmatrix} \begin{bmatrix} x \\ s \end{bmatrix} = \begin{bmatrix} r_x \\ r_s \end{bmatrix} \tag{23}$$

The first step of the forward solve is to compute:

$$\hat{x}=L^{-1}r_x \tag{24}$$

Then update $r_s$:

$$\hat{r}_s=r_s-A_{sx}U^{-1}\hat{x} \tag{25}$$

This leaves a matrix equation having the s's as unknowns:

$$[A_{ss}(w)-A_{sx}U^{-1}L^{-1}A_{xs}]s=\hat{r}_s \tag{26}$$

Then solve this matrix equation for s. As necessary, update w using Equations (11) and (12), recompute $A_{ss}(w)$, and recompute the matrix on the left-hand side of Equation (26). Then solve again for s. This process is iteratively repeated until all w's are either zero or one. When the w's have converged, backsolve for x. The fundamental matrix equation is:

$$\begin{bmatrix} U & L^{-1}A_{xs} \\ 0 & I \end{bmatrix} \begin{bmatrix} x \\ s \end{bmatrix} = \begin{bmatrix} \hat{x} \\ s \end{bmatrix} \quad (27)$$

which simplifies to:

$$x = U^{-1}(\hat{x} - L^{-1}A_{xs}s) \quad (28)$$

The equations presented above are set up such that $w_c=1$ indicates that constraint c (which could be a separator outflow stream) is active, such that $w_c=0$ indicates that constraint c is inactive, such that $s_c \leq 0$ indicates that $w_c$ should move toward zero, and such that $s_c > 0$ indicates that $w_c$ should move toward one. This makes it possible to treat the slack variables, the multipliers, and their corresponding parameters (i.e., w's) in an abstract fashion. That is, the slack variables can be solved for and the parameters adjusted without knowing which constraints or the kinds of constraints with which they are associated.

The process of the present invention therefore, enables the determination of active constraints without having to solve the entire network.

Alternatively, if the state of a constraint is obvious, it can simply be set to its active state rather than treating it with a slack variable.

Method Description

Referring now to FIG. 2, the present invention may be applied to this exemplary over-constrained surface-facility network using slack variables to ensure that the correct constraint equation is always satisfied. The slack variable times a multiplier is added to the constraint equation. Then, if the constraint is inactive, the multiplier is one, and the slack variable, which is multiplied by one, takes up the slack—that is, it becomes the amount by which the inactive constraint is not satisfied. On the other hand, if the constraint is active, then the multiplier is zero, and the slack variable is multiplied by zero. As a result, the constraint equation, as originally written, is satisfied. Slack variables $s_1$ and $s_2$ are added to the hydraulics equation and constraint equation of Conn1 and Conn2, respectively. The slack variables ($s_1$ and $s_2$) are associated with the parameters $w_1$ and $w_2$, respectively. Applying these principles to the surface-facility network in FIG. 2, the system equation then becomes:

Connection 1: $-p_1 + p_2 + b_1 q_1 + c_1 + w_1 s_1 = 0$, (29)

$-q_1 + (1-w_1)s_1 = -1000$, (30)

Connection 2: $-p_2 + p_3 + b_2 q_2 + c_2 + w_2 s_2 = 0$, (31)

$-q_2 + (1-w_2)s_2 = -2000$, (32)

Node 2: $q_1 - q_2 = 0$, (33)

where equations (29) and (30) are the hydraulics equation (known as the base equation) and rate constraint equation (both with slack variable $s_1$), respectively, at Conn1. Equations (31) and (32) are the hydraulics equation and rate constraint equation (both with slack variable $s_2$), respectively, at Conn2. Equation (33) is the mass balance equation at Node2. The unknown set is $q_1$, $q_2$, $p_2$, $s_1$, and $s_2$.

The initial values of $w_1$ and $w_2$ are some value between 0 and 1, preferably 0.5. Once these parameters are specified, the coefficients in equations (29)-(33) are computed and the resulting system of equations is solved. If the solution for a slack variable is negative, then its associated parameter (w) will be adjusted to be closer to 0 using Equation (11). If the solution for a slack variable is positive, then its associated parameter (w) will be adjusted to be closer to 1 using Equation (12). The coefficients in the system of equations may be recomputed, the resulting equations may then be solved, and the parameters may be adjusted again. This procedure is repeated until all parameters ($w_1$, $w_2$) are either 0 or 1. This condition is equivalent to saying that all multipliers are either 0 or 1. Summing Equations (29) and (30) and Equations (31) and (32) yields combined constraint-hydraulics equations that do not contain w. Then, as described with respect to Equation (22) through Equation (28), all network unknowns (rates and pressures) can be eliminated at the beginning of the procedure, which results in a sub-system for the slack variables; only the sub-system for slack variables needs to be solved repeatedly in this manner since only the equations in this sub-system are affected by the parameters. After all w's are zero or one, the slack variables are known, and the network unknowns can be solved by back-substitution. When the value of $w_1$ or $w_2$ is 0, the constraint at the corresponding connection is inactive and the hydraulics equation is satisfied exactly. Otherwise, the w is one and the constraint is active. The active (i.e. correct) constraints are therefore, identified by incrementally adjusting the parameters up or down between two predetermined values (e.g. 0 to 1) until each is equal to one of the two values.

The use of slack variables enables the user to match unknowns with the same number of equations and does not require the calculation of the maximum value of an objective function as required by conventional optimization methods.

Figure 5:
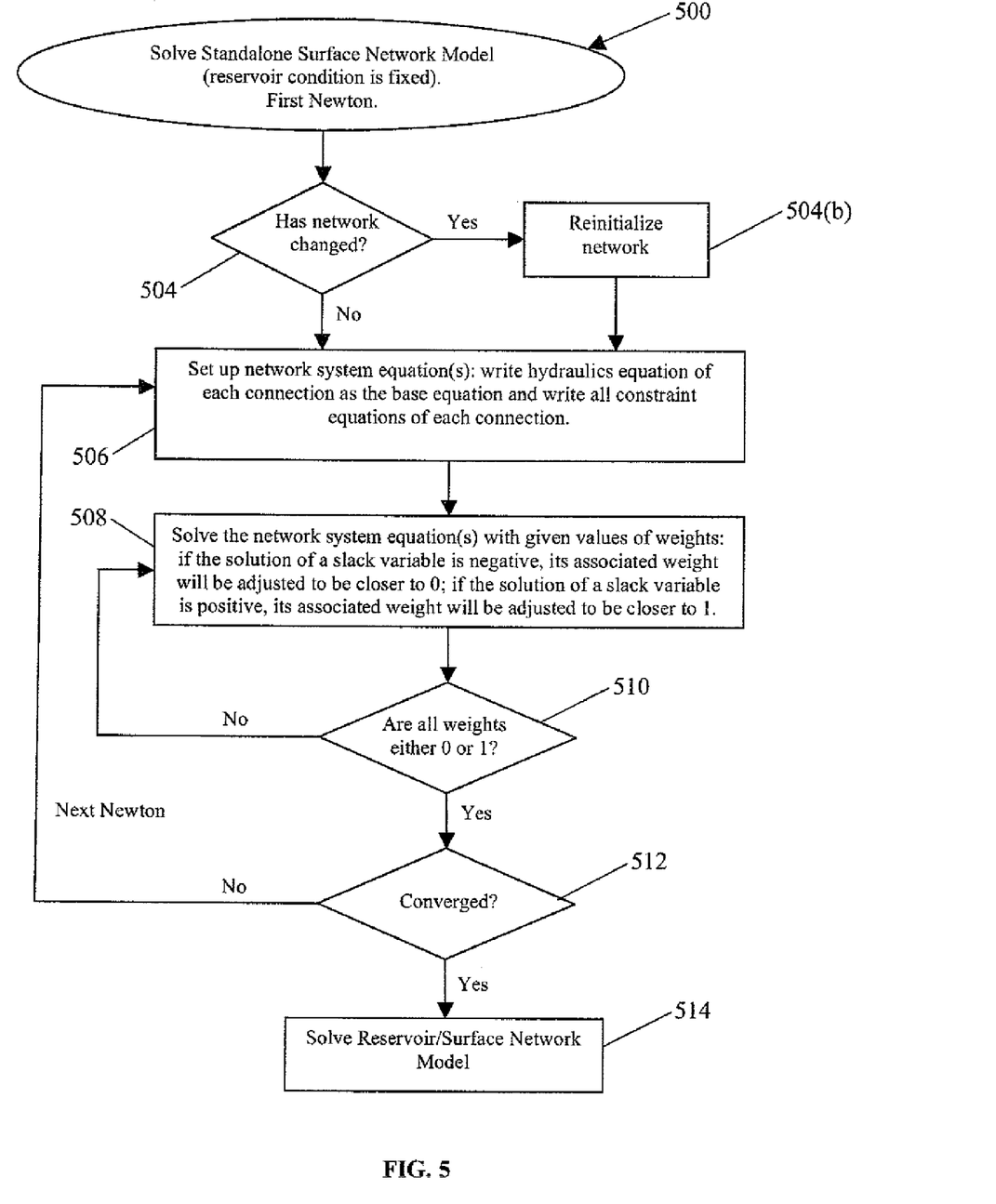
FIG. 5 is a flow diagram illustrating a method for implementing the present invention and determining the active constraints in a surface-facility network.

Referring now to FIG. 5, a method 500 is illustrated for implementing the present invention and determining the active constraints in a surface-facility network using slack variables. The method 500 therefore, may be used to solve the standalone-surface-network model at step 304 in FIG. 3 in a more efficient and accurate manner than the conventional method 400 illustrated in FIG. 4. The method 500 begins at the first Newton of the standalone network solve. In step 504, the user specified network configuration and constraints are checked for any change at the current time step. If there is no change, then the method 500 proceeds to step 506; otherwise, the network is reinitialized at step 504(b) and then the method 500 proceeds to step 506.

In step 506, the network system equation is set up by writing a hydraulics equation for each connection. At each connection that can possibly be constrained, this is the base equation. The network system equation setup is completed by writing all constraint equations for connections that can possibly be constrained. Each constraint is associated with a slack variable and a multiplier, with the multiplier computed based on a predetermined parameter (w) value greater than zero and less than 1, preferably 0.5. In step 508, the network system equation is solved with the given parameter (w) values. If, for example, the solution of a slack variable is negative, its associated w will be adjusted to be closer to 0. If, however, the solution of a slack variable is positive, its associated w will be adjusted to be closer to 1. In step 510, all w's are reviewed to determine whether they are 0 or 1. If any w is neither 0 nor 1, the method 500 proceeds to repeat at step 508. If, however, all w's are either 0 or 1, then the method 500 proceeds to step 512 where convergence is determined. If convergence is not achieved, the method 500 repeats at step 506. If convergence is achieved, the method 500 proceeds to step 514 where the coupled reservoir/surface network model is solved.

Figure 6:
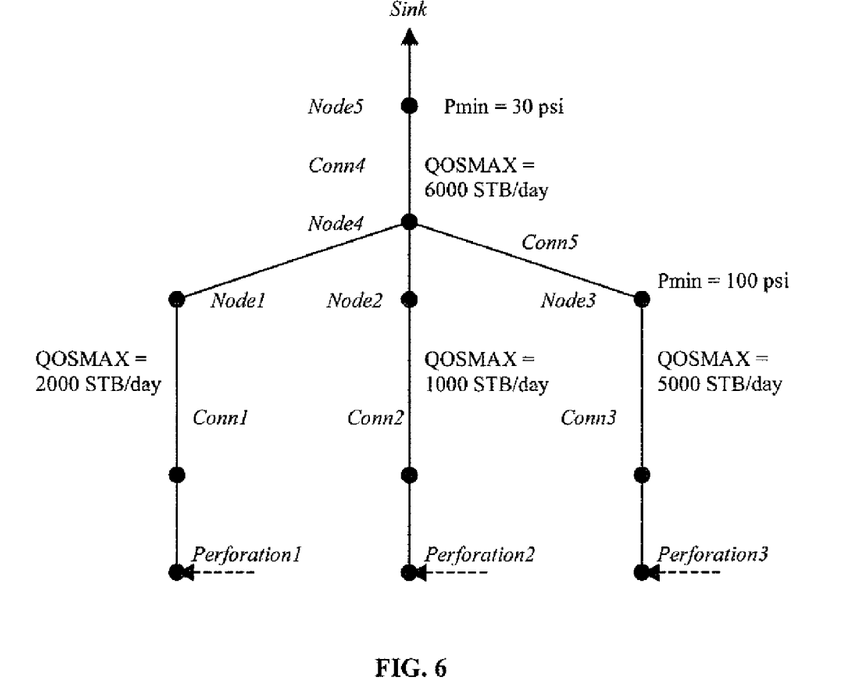
FIG. 6 is an exemplary surface-facility network for illustrating the determination of the active constraints according to the present invention.

Referring now to FIG. 6, an exemplary surface facility network is illustrated for determining active constraints according to the method 500. In FIG. 6, three production wells (Conn1, Conn2 and Conn3) connect to a gathering center (Node4), which is eventually connected to a Sink. In addition, there are four QOSMAX (maximum oil phase rate constraint at a surface condition) constraints at Conn1, Conn2, Conn3 and Conn4, and two $P_{min}$ (minimum pressure) constraints at Node3 and Node5. There are six constraints in total. However, since the $P_{min}$ constraint at Node5 works as a boundary condition and it must be satisfied, only five slack variables are needed for the remaining five constraints, each associated with a w.

The fluid flowing in the network is modeled with a black-oil model, which consists of oil, gas and water components. The reservoir condition is assumed to be constant during the network solve.

Table 1 shows the slack variable index for each constraint.

TABLE 1

Slack variable index for each constraint.

| Slack variable Index | Constraint |
|---|---|
| 1 | QOSMAX constraint at Conn1 |
| 2 | QOSMAX constraint at Conn2 |
| 3 | QOSMAX constraint at Conn3 |
| 4 | $P_{min}$ constraint at Node3 |
| 5 | QOSMAX constraint at Conn4 |

Table 2 shows the values of w and the solution of corresponding slack variables (s) at all iterations demonstrated as step 508 and step 510 in FIG. 5.

TABLE 2

Values of parameters (w) and solution of slack variables (s) at all linear solver iterations of a network Newton step.

| | | Slack variable Index | | | | |
|---|---|---|---|---|---|---|
| | | 1 | 2 | 3 | 4 | 5 |
| Iteration 1 | W | 0.5 | 0.5 | 0.5 | 0.5 | 0.5 |
| | S | −5295.81 | −5093.06 | −2336.14 | −3197.77 | 9733.32 |
| Iteration 2 | W | 5.00E−03 | 5.00E−03 | 5.00E−03 | 5.00E−03 | 0.995 |
| | S | −3737.5 | 4499.522 | −12036.3 | −1090.41 | 2256.65 |
| Iteration 3 | W | 5.00E−05 | 0.99005 | 5.00E−05 | 5.00E−05 | 0.99995 |
| | S | 1633.515 | 115.3177 | −12864.3 | −1058.53 | 2187.111 |
| Iteration 4 | W | 0.990001 | 0.999901 | 5.00E−07 | 5.00E−07 | 1 |
| | S | 25.20667 | 126.9819 | −11229.4 | −1052.11 | 2174.212 |
| Iteration 5 | W | 0.9999 | 0.999999 | 0 | 0 | 1 |
| | S | 24.96703 | 126.9776 | −11229.2 | −1052.1 | 2174.203 |
| Iteration 6 | W | 0.999999 | 1 | 0 | 0 | 1 |
| | S | 24.9646 | 126.9775 | −11229.2 | −1052.1 | 2174.203 |
| Iteration 7 | W | 1 | 1 | 0 | 0 | 1 |
| | S | 24.96457 | 126.9775 | −11229.2 | −1052.1 | 2174.203 |

As illustrated by the method 500 in FIG. 5, the initial value of each w is 0.5 and is adjusted according to the solution value for each corresponding slack variable after each iteration. In FIG. 5 (step 510), the w values are checked at the end of each iteration and the method 500 repeats at step 508 if any w is neither 0 nor 1. At the last (7th) iteration, all w values are either 0 or 1. The slack variables, as well as the network unknowns, are solved and this Newton step of the network solve is finished. A convergence check follows at step 512. If the solution has not converged yet, it proceeds to the next Newton step and the method repeats at step 506 until convergence is achieved. Otherwise, the method proceeds to the coupled reservoir/network solve at step 514 in FIG. 5. The use of slack variables according to the present invention may also be useful in solving the coupled reservoir/surface network model at step 514 in FIG. 5.

According to the solution, the values of w for constraints at Conn1, Conn2 and Conn4 are 1. Therefore, these constraints are active. The values of w for constraints at Conn3 and Node3 are 0, which means Conn3 and Conn5 are governed by their hydraulics equations. Checking the solution of the phase rates and node pressures of the network, as partially listed in Table 3, confirms all constraints have been satisfied (not-violated) properly.

TABLE 3

Solution of oil phase rates and node pressures of the network and corresponding constraint status.

| Oil phase rate at Conn1 | 2000 STB/day | w = 1 | Constraint active |
|---|---|---|---|
| Oil phase rate at Conn2 | 1000 STB/day | w = 1 | Constraint active |
| Oil phase rate at Conn3 | 3000 STB/day | w = 0 | Constraint inactive |
| Pressure at Node3 | 2204.203 psi | w = 0 | Constraint inactive |
| Oil phase rate at Conn4 | 6000 STB/day | w = 1 | Constraint active |

Thus, the example in FIG. 6 makes clear that the slack variable method provides various advantages over conventional methods for determining active constraints in a surface-facility network including, but not limited to, improved reliability, efficiency, accuracy and simulation speed.

System Description

The present invention may be implemented through a computer-executable program of instructions, such as program modules, generally referred to as software applications or application programs executed by a computer. The software may include, for example, routines, programs, objects, components, and data structures that perform particular tasks or implement particular abstract data types. The software forms an interface to allow a computer to react according to a source of input. Nexus®, which is a commercial software application marketed by Landmark Graphics Corporation, may be used as an interface application to implement the present invention. The software may also cooperate with other code segments to initiate a variety of tasks in response to data received in conjunction with the source of the received data. The software may be stored onto any variety of memory media such as CD-ROM, magnetic disk, bubble memory and semiconductor memory (e.g., various types of RAM or ROM). Furthermore, the software and its results may be transmitted over a variety of carrier media such as optical fiber, metallic wire, free space and/or through any of a variety of networks such as the Internet.

Moreover, those skilled in the art will appreciate that the invention may be practiced with a variety of computer-system configurations, including hand-held devices, multiprocessor systems, microprocessor-based or programmable-consumer electronics, mini-computers, mainframe computers, and the like. Any number of computer-systems and computer networks are acceptable for use with the present invention. The invention may be practiced in distributed-computing environments where tasks are performed by remote-processing devices that are linked through a communications network. In a distributed-computing environment, program modules may be located in both local and remote computer-storage media including memory storage devices. The present invention may therefore, be implemented in connection with various hardware, software or a combination thereof, in a computer system or other processing system.

Figure 7:
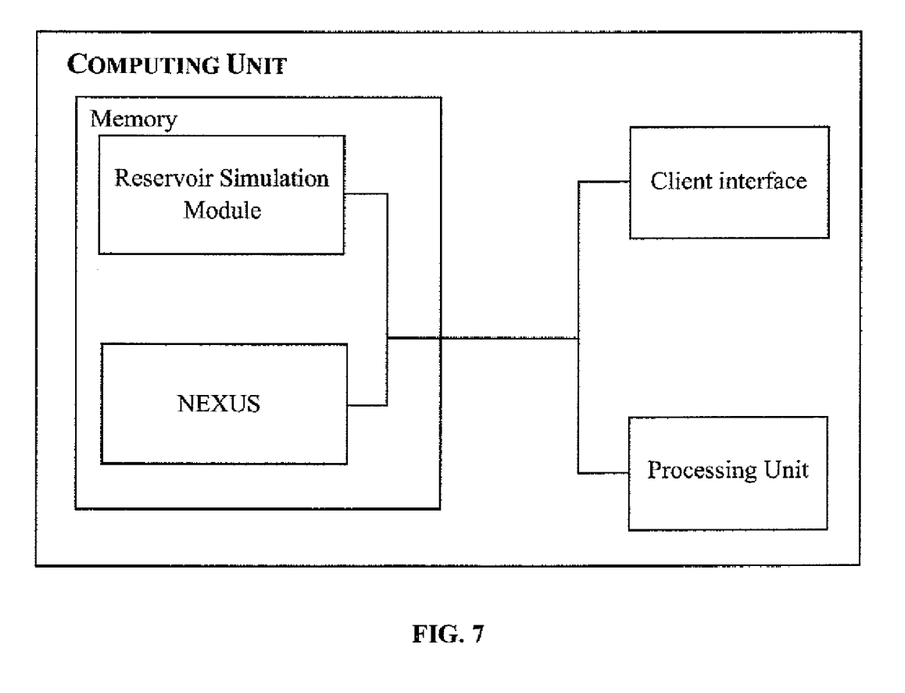
FIG. 7 is a block diagram illustrating a system for implementing the present invention.

Referring now to FIG. 7, a block diagram of a system for implementing the present invention on a computer is illustrated. The system includes a computing unit, sometimes referred to a computing system, which contains memory, application programs, a client interface, and a processing unit. The computing unit is only one example of a suitable computing environment and is not intended to suggest any limitation as to the scope of use or functionality of the invention.

The memory primarily stores the application programs, which may also be described as program modules containing computer-executable instructions, executed by the computing unit for implementing the present invention described herein and illustrated in FIG. 5. The memory therefore, includes a reservoir simulation module, which enables the method illustrated in FIG. 5, and Nexus®.

Although the computing unit is shown as having a generalized memory, the computing unit typically includes a variety of computer readable media. By way of example, and not limitation, computer readable media may comprise computer storage media. The computing system memory may include computer storage media in the form of volatile and/or nonvolatile memory such as a read only memory (ROM) and random access memory (RAM). A basic input/output system (BIOS), containing the basic routines that help to transfer information between elements within the computing unit, such as during start-up, is typically stored in ROM. The RAM typically contains data and/or program modules that are immediately accessible to and/or presently being operated on by the processing unit. By way of example, and not limitation, the computing unit includes an operating system, application programs, other program modules, and program data.

The components shown in the memory may also be included in other removable/nonremovable, volatile/nonvolatile computer storage media. For example only, a hard disk drive may read from or write to nonremovable, nonvolatile magnetic media, a magnetic disk drive may read from or write to a removable, non-volatile magnetic disk, and an optical disk drive may read from or write to a removable, nonvolatile optical disk such as a CD ROM or other optical media. Other removable/non-removable, volatile/non-volatile computer storage media that can be used in the exemplary operating environment may include, but are not limited to, magnetic tape cassettes, flash memory cards, digital versatile disks, digital video tape, solid state RAM, solid state ROM, and the like. The drives and their associated computer storage media discussed above provide storage of computer readable instructions, data structures, program modules and other data for the computing unit.

A client may enter commands and information into the computing unit through the client interface, which may be input devices such as a keyboard and pointing device, commonly referred to as a mouse, trackball or touch pad. Input devices may include a microphone, joystick, satellite dish, scanner, or the like.

These and other input devices are often connected to the processing unit through the client interface that is coupled to a system bus, but may be connected by other interface and bus structures, such as a parallel port or a universal serial bus (USB). A monitor or other type of display device may be connected to the system bus via an interface, such as a video interface. In addition to the monitor, computers may also include other peripheral output devices such as speakers and printer, which may be connected through an output peripheral interface.

Although many other internal components of the computing unit are not shown, those of ordinary skill in the art will appreciate that such components and the interconnection are well known.

The slack variable method is systematic and automatic—meaning the system may be solved for any structure in the network once the system equation(s) have been setup. Conversely, the performance of conventional methods depends on how well the logic inspects different structures in the network and different combinations of the constraints—which may miss or remove some extraneous constraints and result in the premature termination of the simulation. Moreover, the slack variable method should work, without the need for new code to check if the specific constraint is extraneous, if a new kind of constraint is added. The present invention therefore, (1) overcomes unrecognized situations by eliminating the need to address every possible situation (network configuration and constraint types), (2) avoids the need to revise the system description of the situation, and (3) provides faster solutions if the network equation system in a coupled reservoir/network solve also uses the slack variable method because the conventional method may determine a different set of active constraints between the standalone network solve and the coupled reservoir/network solve, which results in at least one more Newton step for the coupled reservoir/network solve.

While the present invention has been described in connection with presently preferred embodiments, it will be understood by those skilled in the art that it is not intended to limit the invention to those embodiments. It is therefore, contemplated that various alternative embodiments and modifications may be made to the disclosed embodiments without departing from the spirit and scope of the invention defined by the appended claims and equivalents thereof. The present invention, for example, may be used in other applications outside of the oil and gas industry to determine active constraints in other types of networks.

The invention claimed is:

1. A method for determining active constraint equations in a network, comprising:
    selecting at least one constraint equation for a connection in the network, each constraint equation including a respective slack variable and a respective slack variable multiplier;
    selecting a base equation for each connection in the network, the base equation for the network connection with the at least one constraint equation including the respective slack variable of each constraint equation and another respective slack variable multiplier for the respective slack variable of each constraint equation;

solving for each respective slack variable using a computer system;

adjusting a respective parameter for each respective slack variable multiplier and each respective another slack variable multiplier based on a solution for each respective slack variable;

repeating the steps of solving for each respective slack variable and adjusting a respective parameter for each respective slack variable multiplier and each respective another slack variable multiplier until each respective parameter is equal to 0 or 1; and determining whether each constraint equation in the network is active based on whether the respective parameter for each constraint equation is equal to 1.

2. The method of claim 1, further comprising selecting a mass balance equation for each node in the network.

3. The method of claim 2, further comprising:
solving each active constraint equation in the network;
solving each mass balance equation in the network; and
solving each base equation in the network for each network connection without a constraint equation.

4. The method of claim 1, wherein the base equation for the network connection, with the at least one constraint equation, is a hydraulics equation and the at least one constraint equation is a rate constraint equation.

5. The method of claim 1, further comprising selecting another constraint equation for another connection in the network.

6. The method of claim 1, wherein each respective parameter is initially set at 0.5 and is adjusted toward 0 if the solution for a respective slack variable is less than or equal to zero and is adjusted toward 1 if the solution for the respective slack variable is greater than zero.

7. The method of claim 6, wherein each respective parameter is adjusted toward 1 by multiplying one minus the respective parameter by a reduction factor and each respective parameter is adjusted toward 0 by multiplying the respective parameter by another reduction factor.

8. The method of claim 1, further comprising:
adding the respective slack variable for each constraint equation to the base equation for the network connection with the at least one constraint equation if the respective parameter for each constraint equation is equal to 1.

9. A computer readable medium having computer executable instructions for determining active constraint equations in a network, comprising:
selecting at least one constraint equation for a connection in the network, each constraint equation including a respective slack variable and a respective slack variable multiplier for the respective slack variable of each constraint equation;

selecting a base equation for each connection in the network, the base equation for the network connection with the at least one constraint equation including the respective slack variable of each constraint equation and another respective slack variable multiplier;

solving for each respective slack variable;

adjusting a respective parameter for each respective slack variable multiplier and each respective another slack variable multiplier based on a solution for each respective slack variable;

repeating the steps of solving for each respective slack variable and adjusting a respective parameter for each respective slack variable multiplier and each respective another slack variable multiplier until each respective parameter is equal to 0 or 1; and determining whether each constraint equation in the network is active based on whether the respective parameter for each constraint equation is equal to 1.

10. The computer readable medium of claim 9, further comprising selecting a mass balance equation for each node in the network.

11. The computer readable medium of claim 10, further comprising:
solving each active constraint equation in the network;
solving each mass balance equation in the network; and
solving each base equation in the network for each network connection without a constraint equation.

12. The computer readable medium of claim 9, wherein the base equation for the network connection, with the at least one constraint equation, is a hydraulics equation and the at least one constraint equation is a rate constraint equation.

13. The computer readable medium of claim 9, further comprising selecting another constraint equation for another connection in the network.

14. The computer readable medium of claim 9, wherein each respective parameter is initially set at 0.5 and is adjusted toward 0 if the solution for a respective slack variable is less than or equal to zero and is adjusted toward 1 if the solution for the respective slack variable is greater than zero.

15. The computer readable medium of claim 14, wherein each respective parameter is adjusted toward 1 by multiplying one minus the respective parameter by a reduction factor and the respective parameter is adjusted toward 0 by multiplying the respective parameter by another reduction factor.

16. The computer readable medium of claim 9, further comprising:
adding the slack variable for each constraint equation to the base equation for the network connection with the at least one constraint equation if the respective parameter for each constraint equation is equal to 1.

* * * * *

UNITED STATES PATENT AND TRADEMARK OFFICE
CERTIFICATE OF CORRECTION

| | | |
|---|---|---|
| PATENT NO. | : 7,668,707 B2 | |
| APPLICATION NO. | : 12/258876 | |
| DATED | : February 23, 2010 | |
| INVENTOR(S) | : James William Watts, III, Graham Fleming and Qin Lu | |

It is certified that error appears in the above-identified patent and that said Letters Patent is hereby corrected as shown below:

In Column 7, Line 10
  --Replace "(1-R)" with "(R)"--

Signed and Sealed this
Twenty-seventh Day of November, 2012

David J. Kappos
*Director of the United States Patent and Trademark Office*